April 15, 1930.  S. W. SMITH ET AL  1,755,154
AUTOMATIC WEIGHER
Filed Sept. 30, 1927  2 Sheets-Sheet 1

Fig. 1.

April 15, 1930.  S. W. SMITH ET AL  1,755,154
AUTOMATIC WEIGHER
Filed Sept. 30, 1927  2 Sheets-Sheet 2
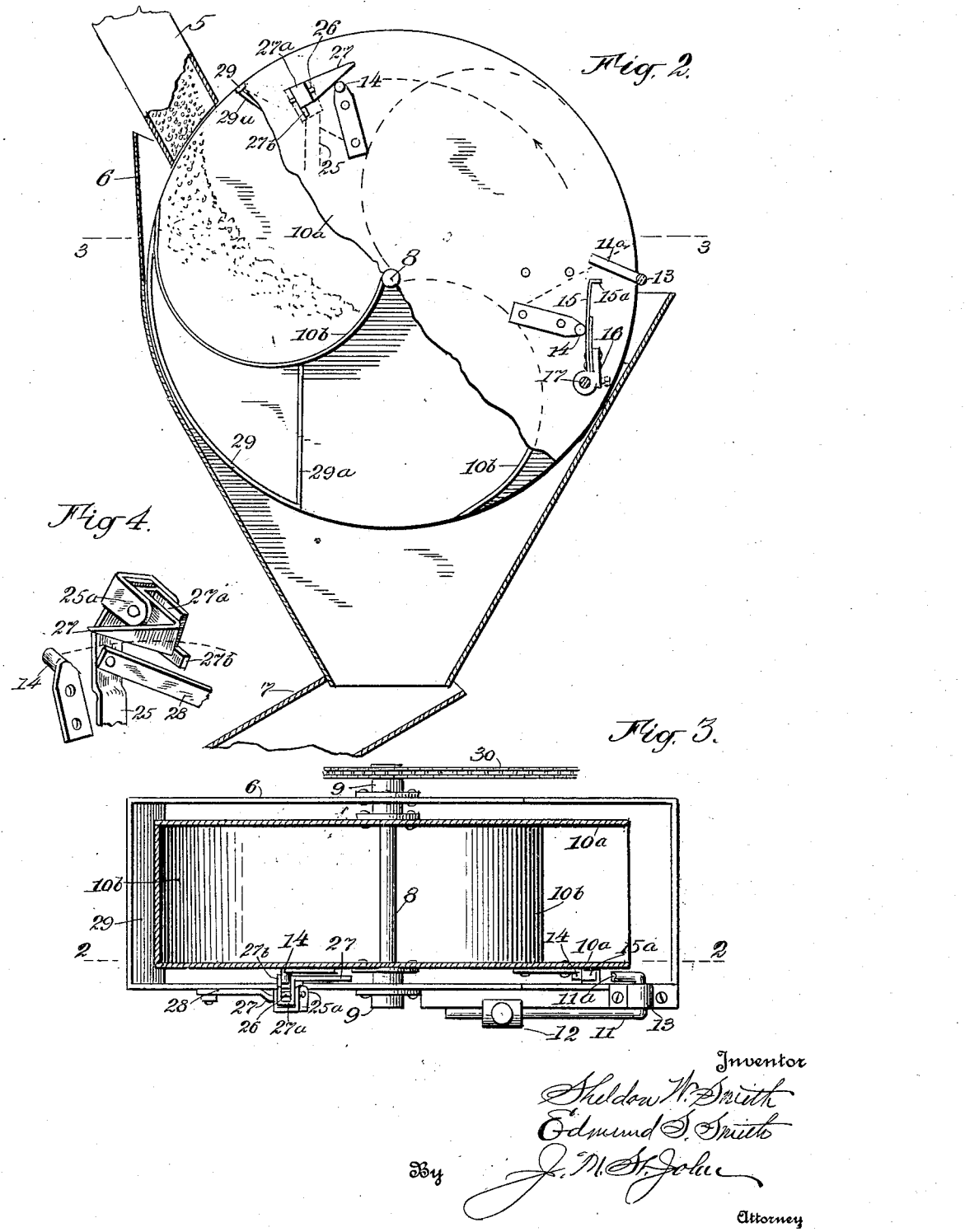

Patented Apr. 15, 1930

1,755,154

UNITED STATES PATENT OFFICE

SHELDON W. SMITH AND EDMUND S. SMITH, OF SPRINGVILLE, IOWA

AUTOMATIC WEIGHER

Application filed September 30, 1927. Serial No. 223,141.

This invention relates to the automatic weighing of grain, and more particularly as the same is delivered from threshing machines.

The object of the invention is to render more accurate and efficient the type of weigher shown and described in Letters Patent No. 1,574,706, issued to J. W., S. W. and E. S. Smith on February 23, 1926.

The invention is fully disclosed in the description and claims following, reference being had to the accompanying drawing, in which:—

Fig. 1 is a side elevation of weighing apparatus embodying this invention. Fig. 2 is a similar view, but partly in section in the line 2—2 of Fig. 3. Fig. 3 is a plan view of the same, the rotor being in section in the line 3—3 of Fig. 2. Fig. 4 shows details of the auxiliary stop in perspective.

In the drawing, the numeral 5 denotes the discharge spout for grain from any source, as from a threshing machine. This is disposed above and near one side of a hopper 6 opening at the bottom into a chute 7 supposed to lead to a grain receptacle not shown. Rotatably mounted on an axis 8 carried in bearings 9 at the upper edge of the hopper, is a rotor 10 turnable by the gravity of its load of grain. The rotor comprises a pair of circular disks $10^a$ and uniformly disposed curved buckets $10^b$, herein shown as three in number. These receive the grain successively from the discharge spout, and when filled to a certain capacity trip a scale-beam by gravity, and turn quickly by gravity to discharging position. The movement is in the direction indicated by the arrow. In Fig. 1 the rotor is in the position as stopped to receive the load. In Fig. 2 it is shown as nearing such position and being retarded by mechanism to be described presently.

Near the top of the hopper at one side is mounted a scale-beam 11 provided with an adjustable poise 12. The beam is pivoted at 13, and has a short arm $11^a$ extending inwardly and normally in the path of studs 14 equally disposed at the side of the rotor, and of the same number as the buckets. When the load in any bucket is of the right weight to lift the poise, the scale-beam tips, as will be evident, and the rotor turns to the discharging position, as clearly shown in Fig. 2. All the foregoing is substantially shown in the patent above referred to, and to which reference may be had.

One of the improvements herein relates to an elastic and frictional retarder for the rotor as it approaches the position of rest. When the scale-beam trips and releases the rotor, the latter turns very quickly. This momentum, unless retarded, would be sufficient to trip the scale-beam again, so a spring 15 is disposed below the trip-arm of the scale-beam and in the path of the studs, which slide along the spring, bending it as they pass. The spring itself is not a new feature, but in the patent above referred to no provision was made for adjusting its tension and friction, and this in practice is found to be essential, both in initial installation and in regular use. In the case of the improved device a leaf spring is attached to a hub 16, and this is mounted rockably at the side of the hopper, as by a short shaft 17 in a bearing 18. To the outer end of the shaft is attached an arm 19, preferably slotted at $19^a$ for the adjustable connection, by a thumb-nut 20, of a screw-threaded link 21 passing through a fixed bracket 22 and provided with set-nuts 23. By this means the approximate adjustment is obtained by the wing-nut and slot, and the delicate adjustment by means of the set-nuts. This makes it possible to adjust the spring with such nicety that the momentum of the rotor may be depended upon to carry the stud to the top of the spring (offset at $15^a$ as a back-stop) and under the trip-lever $11^a$.

It is desirable to make this retardation of the rotor comparatively slight, than otherwise, so that the stud will always reach the trip-lever, rather than stop in contact with the face of the spring, as this might tend to make the action of the rotor more or less uncertain and the weighing inaccurate. In order, therefore, to permit the stud to slip over the spring freely, and still prevent a too sudden jarring contact with the trip-lever, an auxiliary and positive stop is provided to engage another stud an instant before the rotor reaches its final position of rest. Details of this stop are best shown in Fig. 4. A standard 25 attached to the side of the hopper is provided with bearing-lugs 25ᵃ, and to these is pivoted at 26 a tilting cam 27. The body of the cam is stirrup-shaped at 27ᵃ, and one of the wings has an abutment 27ᵇ, which when the cam is lifted by the passing under it of the stud serves as a positive, but momentary stop for the same. As soon as the stop acts, the cam drops to its normal position by gravity, when the stud may move gently forward the slight distance to its final position, passing over the abutment. This permits the other stud to reach its final position of rest under the trip-lever with certainty, but with no disturbance of the scale-beam. Both the standard and its brace 28 are slotted at 28ᵃ for nice adjustment of the auxiliary stop with respect to the trip-lever.

A further improvement is best shown in Fig. 2, the purpose of which is to prevent leakage of grain through the hopper and outside the rotor buckets while the rotor is turning to discharge a load. This is effected by providing the rotor with segmental rims 29, preferably connecting with the backs of the buckets by partitions 29ᵃ and extending the feed-spout 5, closely to the periphery of the rotor, so that the rims as they pass under the spout arrest the flow of grain until the succeeding bucket is in position for filling. This prevents any possible escape of grain through the hopper past the buckets, and insures accurate filling of the buckets according to a predetermined weight.

A registering device is supported to cooperate with the weigher, driven by a sprocket chain 30, as indicated in the patent above referred to.

We claim:

1. An automatic weigher for grain and the like, comprising a hopper, means for delivering material to and from the same, a rotor provided with a series of equal buckets, and turning by the weight of its load in the hopper, a series of equally spaced lateral stop-studs, a scale-beam having a trip-lever disposed in the path of said studs, a frictional spring retarder in the path of the stud's movement toward the trip-lever, means adapted for the rocking of said spring, and screw-threaded adjusting means connecting with said rocking means.

2. In an automatic weigher having a gravity actuated rotor turnably mounted in a hopper, and provided with lateral stop-studs, an intercepting weighted trip-lever, a frictional retarder in the path of the studs as they approach the trip-lever, and an auxiliary positive stop for the rotor, the same being a hook with a cam face disposed normally in the path of said studs, whereby the hook is moved to stopping position by the passage of a stud, but moves to normal position as soon as the rotor stops.

3. In an automatic weigher having a gravity-turning rotor mounted in a hopper, and provided with lateral stop-studs, an intercepting, weight-controlled trip-lever, an auxiliary positive rotor-stop, the same being a tiltable member provided with an abutment to intercept the stud when said rotor-stop is tilted thereby, but normally out of the path thereof, and an adjustable support for said motor-stop.

In testimony whereof we affix our signatures.

SHELDON W. SMITH.
EDMUND S. SMITH.